US005310589A

United States Patent [19]

Nagashima

[11] Patent Number: 5,310,589

[45] Date of Patent: May 10, 1994

[54] HEAT TRANSFER SHEET AND BASE SHEET THEREFOR

[75] Inventor: Kousaku Nagashima, Kitamoto, Japan

[73] Assignee: Lintec Corporation, Tokyo, Japan

[21] Appl. No.: 812,160

[22] Filed: Dec. 23, 1991

[30] Foreign Application Priority Data

Dec. 26, 1990 [JP] Japan .................................. 2-406730

[51] Int. Cl.$^5$ .................................................. B32B 3/00

[52] U.S. Cl. ......................................... 428/40; 428/42; 428/195; 428/200; 428/484; 428/488.1

[58] Field of Search .................... 428/40, 42, 195, 200, 428/484, 488.1

[56] References Cited

U.S. PATENT DOCUMENTS

| | | | |
|---|---|---|---|
| 3,928,710 | 12/1975 | Arnold et al. . | |
| 4,513,107 | 4/1985 | Fabbrini | 524/56 |
| 4,542,078 | 9/1985 | Fitzer et al. | 428/914 |
| 4,565,842 | 1/1986 | Fitzer et al. | 428/914 |
| 4,692,198 | 9/1987 | Borresen . | |
| 4,737,224 | 4/1988 | Fitzer et al. | 524/97 |
| 5,078,427 | 1/1992 | Ishii et al. | 231/81 |

FOREIGN PATENT DOCUMENTS

| | | |
|---|---|---|
| 2847702 | 5/1980 | Fed. Rep. of Germany . |
| 0224583 | 11/1985 | Japan . |
| WO84/04496 | 11/1984 | PCT Int'l Appl. . |

OTHER PUBLICATIONS

Patent Abstracts of Japan, vol. 1, No. 1158 (M-591), May 22, 1987, JP 61291373, Shiromoto Tokinori, Cutter Device for Stencil with Winder.

*Primary Examiner*—B. Hamilton Hess
*Assistant Examiner*—Elizabeth Evans
*Attorney, Agent, or Firm*—Finnegan, Henderson, Farabow, Garrett & Dunner

[57] ABSTRACT

A base sheet and a heat transfer sheet are herein provided and make it possible to cut out any arbitrary figure or design from the heat transfer sheet having a thin heat transferable layer with an automatic cutting machine. The base sheet has a first support member and a second support member peelably integrated with the first support member, while the heat transfer sheet has the foregoing base sheet and the transferable layer formed on the second support member of the base sheet optionally through a releasing layer.

16 Claims, 1 Drawing Sheet

HEAT TRANSFER SHEET AND BASE SHEET THEREFOR

BACKGROUND OF THE INVENTION

1. Field of the Invention

The present invention relates to a heat transfer sheet and a base sheet for a heat transfer sheet for transferring letters, patterns or the like on a substance to which they are transferred.

2. Description of the Prior Art

There have been used a heat transfer paper for transferring letters and figures and designs on a substance to which these letters, figures, patterns or designs and patterns are transferred (hereinafter referred to as "transfer substance") for the purpose of display and/or decoration. The heat transfer paper comprises substrates of paper or plastic films provided thereon with a thermally adherable transfer layer through a releasing layer or comprises the foregoing substrates provided thereon with a thermally transferable layer capable of being sublimated. When heat transfer paper is used for transferring letters, figures and designs to a transfer substance, there have been known a variety of transfer methods. For instance, an example thereof comprises printing desired letters, figures and designs, in advance, on a substrate with a thermally transferable material according to a proper printing method such as silk screen printing, gravure printing or offset printing and then transferring them to a transfer substance and another example thereof comprises applying a thermally transferable layer on the whole surface of a substrate, cutting out desired letters or patterns from the resulting assembly and then transferring it to a transfer substance.

A method in which letters, figures and designs are formed through printing is suitable for preparing a large amount of heat transfer materials of the same letters or figures and designs, but it requires too much expenses for printing and accordingly the unit cost of the products substantially increases in case of small scale production. On the other hand, in the method in which a heat transfer sheet comprising a thermally transferable layer applied onto the whole surface of a substrate is cut into desired letters or figures or designs and transferred to a transfer substance, desired letters or figures or designs can be formed in a predetermined amount according to need. To cut out letters or patterns from a heat transfer sheet can be performed by using a method in which they are cut out by handling. However, taking account of workability and uniformity of letters or patterns to be obtained, it is advantageous that an automatic cutting machine controlled by a computer is used for cutting out them from the heat transfer sheet. There have been known a variety of methods for preparing letters or patterns with such an automatic cutting machine. For instance, an example thereof comprises making grooves which reach the bottom of the substrate of the heat transfer sheet to cut out letters or patterns therefrom and then rearranging them and another example comprises making grooves only in the transfer layer to remove the unnecessary transfer layer. In the former method, the rearrangement of the letters or the patterns separately cut out from the transfer sheet is difficult and, therefore, the latter method is superior to the former.

In the latter method, the removal of the unnecessary portions of the transfer layer by peeling is easy when the thickness of the transfer layer which is applied onto a substrate through a releasing layer is thick, but it is difficult or impossible if the transfer layer is thin. In particular, the removal of the unnecessary portions is impossible in the heat transfer material provided with a thermally transferable layer capable of being sublimated.

SUMMARY OF THE INVENTION

Accordingly, an object of the present invention is to provide a heat transfer sheet which is excellent in heat transfer properties, from which letters, figures, designs or the like can be cut out by means of an automatic cutting system and which makes it possible to easily remove the unnecessary portions.

Another object of the present invention is to provide a base sheet for such heat transfer sheet.

According to an aspect of the present invention, one of the foregoing objects can be achieved by providing base sheet which comprises a first support member and a second support member which is peelably integrated with the first support member and on which a thermally transferable layer is to be formed.

According to another aspect of the present invention, the other object of the present invention can be achieved by providing a heat transfer sheet which comprises a base sheet having a first support member and a second support member peelably integrated with the first support member, and a thermally transferable layer formed on the second support member of the base sheet.

Sheet-like materials having heat resistance sufficient for withstanding the heat applied thereto during heat transfer operations such as paper, plastic films and foils can be used as materials for the first support member of the base sheet for heat transfer sheet. In addition, the second support member can likewise be prepared from paper, plastic films, foils or the like so far as they have heat resistance sufficient for withstanding the heat applied thereto during heat transfer operations. Specific examples thereof usable in the invention are paper such as wood free paper, kraft paper, glassine paper, coated paper and impregnated paper; plastic films such as films of polyethylene, polypropylene, polyethylene terephthalate, polycarbonate, polyimide, polyamide, acetate polymer and ionomer. Further, specific examples thereof usable in the invention are foils such as stainless foils and aluminium foils. Besides, it is also possible to use the foregoing paper/paper, paper/plastic film, plastic film/plastic film, paper/foil, and plastic film/foil composites as the combination of the first and second support members.

The second sheet-like substrate can be applied onto the first sheet-like substrate according to a variety of methods so far as the methods can ensure appropriate peeling properties between the first and second sheet-like substrates. More specifically, these two substrate layers are couched to one another during the paper making process using a paper machine such as a multi layers cylinder paper machine, a cylinder short-Fourdrinier combination paper machine, a cylinder Fourdrinier combination paper machine or a multi layers Fourdrinier paper machine. More particularly, a couched sheet is prepared by properly selecting and/or controlling the thicknesses of these two layers, pulp and chemicals to be used in the process for the production of each layer so that appropriate peeling properties are ensured between these two layers. Alternatively, the first sheet-like substrate is treated with a releasing agent such as silicone resin, long chain alkyl resin, alkyd resin or polyolefine resin, natural wax or synthetic wax and then the second support member is laminated to the first support member. Adhesives used for laminating these substrates are, for instance, those comprising acrylate copolymers and rubbers which may be either of self-curable type, curable type, solvent-based type and emulsion type ones. Further, the amount of the adhesive to be coated ranges from 5 to 100 $g/m^2$ and preferably at 10 to 50 $g/m^2$ expressed in terms of the solid content. Thus, laminated sheet is prepared while properly selecting the combination of the releasing agent and the adhesive so that the appropriate peeling properties are established between these two layers. In this connection, the releasing agent should be applied onto the first support member while the adhesive must be applied onto the second support member, otherwise a transfer substance comes in contact with the adhesive layer on the surface of the first support member which is exposed through the removal of the unnecessary portions of a thermally transferable layer together with the second support member during transfer and as a result, they are adhered to one another.

Further, a second support member is formed by extruding thermoplastic resin such as polyolefine resin on a first support member such as paper. Alternatively, first and second support members are formed at the same time by co-extruding the two layers on forming a plastic film. In this case, in order to establish the appropriate peeling properties between the first and second support members, temperature of these substrates on extruding is controlled.

The heat transfer sheet according to the present invention comprises, on the second support member of the foregoing base sheet for heat transfer sheet, a heat transferable layer having a composition which varies depending on the applications of the resulting heat transfer sheet and the materials for transfer substances. Examples of the heat transferable layers include thermally adherable resins such as polyester resins, acrylic resins, vinyl chloride resins, vinyl chloride copolymer resins, and ethylene-vinyl acetate copolymer resins which may be used alone or in any combination. Besides, inks containing dyes capable of being thermally sublimated can likewise be used as materials for preparing heat transferable layers. These heat transferable layers formed from thermally adherable resins may further comprise coloring agents such as dyes and pigments and other agents for imparting adhension thereto. The heat transferable layer can be applied onto the second support member optionally through a layer of releasing agent.

A base sheet for heat transfer sheet according to the present invention has a first support member, a second support member formed on the first support member and a heat transferable layer formed on the second support member. In use of the the base sheet, grooves, which reach the first support member through the second support member from the heat transferable layer, are formed by cutting out along a periphery of desired letters or patterns by means of the automatic cutting system. More specifically, since a heat transfer sheet according to the present invention has the second support member, it is possible to form a groove having a desired shape by means of the automatic cutting system even if the thickness of the heat transferable layer is thin. After forming the grooves, unnecessary portions of the heat transferable layer, except that portions in which letters to be transferred are done, and the second support member just below of the unnecessary portions are released from the first support member along the foregoing grooves to remove them. Only portions of the desired letters or patterns of the heat transferable layer are remained on the first support member. Further, the heat transferable layer remained on the first support member is brought into contact with a transfer substance and subjected to heating and exertion a pressure thereon. Subsequently, both the first and the second support members, on which the letters or patterns of the heat transferable layer are formed, are released from the transfer substance. On this operation, since the necessary heat transferable layer having shapes of letters or patterns is thermally adhered to the transfer substance, it remains on the transfer substance. As a result, fined and transferred letters or patterns are formed on the transfer substance to finish operation of transfer. Accordingly, by using the heat transfer sheet according to the present invention, it is possible to obtain transferred patterns which has a desired shape if necessarily. The obtained patterns are different from ones which is obtained by printing methods.

Moreover, the present invention provides a heat transfer sheet which is applicable to automatic cutting systems adapted for a variety of applications by changing the construction of the substrate, a releasing agent for a releasing layer and a material for preparing a heat transferable layer depending on the kinds of transfer substances to be used.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Examples of the present invention will hereinafter be explained in more detail with reference to the accompanying drawings.

EXAMPLE 1

Figure 1:
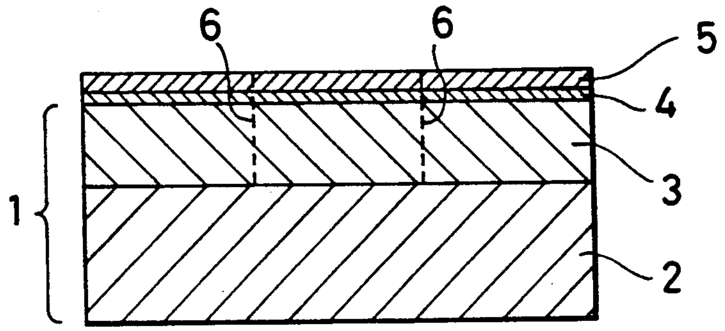
FIG. 1 is a cross sectional view showing an embodiment of a heat transfer sheet according to the present invention.

FIG. 1 is a cross sectional view showing couched base paper and heat transfer paper having the base paper provided thereon with a heat transferable layer, as a first embodiment according to the present invention.

A base paper having a basis weight of 80 $g/m^2$ and Stöckigt sizing degree of 20 seconds was prepared by couching two layers each having a basis weight of 40 $g/m^2$ which were made by a multi layers cylinder paper machine so as to have appropriate peeling properties. Base sheet 1 for heat transfer sheet was prepared by applying an emulsion silicone (KM-768 available from Shin-Etsu Chemical Co., Ltd.) onto one of the paper layers serving as a second support member 3 in an amount of 1 $g/m^2$ (expressed in terms of the solid content) to form a releasing layer 4. Further, a heat transfer sheet was prepared by applying a pigmented resin which comprised an acrylic resin, a vinyl chloride vinyl acetate copolymer resin and a pigment onto the surface coated with silicone releasing layer 4 in an amount ranging from 5 to 10 $g/m^2$ (expressed in terms of the solid content) to form a heat transferable layer 5. The resulting heat transfer sheet was put on a flat bed type automatic cutting machine, cutting marks 6 which were reached the boundary between second support member 3 and first support member 2 were made, from the side of heat transferable layer 5, on the heat transfer sheet along a reversed JIS mark and then the resulting JIS mark cut out therefrom was thermally transferred to polyvinyl chloride cloth for tent in accordance with the procedures described above.

The operation of heat transfer was carried out at a temperature of 110° C. and a pressure of 300 $g/cm^2$ for 3 minutes. The ability of forming cutting marks by the automatic cutting machine, ability of peeling second support member 3 from first support member 2 during the removal of the unnecessary portions of the heat transferable layer and the transfer properties of the heat transfer sheet were all excellent and thus the pattern could be transferred to the transfer substance in good quality.

EXAMPLE 2

A polyethylene resin layer which had a thickness of 17 μm and served as a releasing layer 4 was applied onto the surface of one layer, serving as a second support member 3, of the same base sheet having two layers couched together used in Example 1 and a polyethylene resin layer was likewise applied, in a thickness of 17 μm, onto the surface of the other layer of the base sheet serving as a first support member 2 for the purpose of moisture proofing to thus give base sheet 1 for heat transfer sheet. Further, a heat transferable layer 5 was applied onto the polyethylene resin layer (releasing layer 4) on the side of second support member 3 under the same conditions used in Example 1 to form a heat transfer sheet. This heat transfer sheet was put on a grid type automatic cutting machine, cutting marks 6 were made on the heat transfer sheet along a reversed JIS marks in the same procedures used in Example 1 and then the resulting JIS mark cut out therefrom was transferred to polyvinyl chloride cloth for tent in accordance with the procedures described above and under the same conditions used in Example 1. In this Example, all of the ability of forming cutting marks by the automatic cutting machine, ability of peeling second support member 3 from first support member 2 during the removal of the unnecessary portions of the heat transferable layer and the transfer properties of the heat transfer sheet were likewise excellent and thus the pattern could be transferred to the transfer substance in good quality.

EXAMPLE 3

A base paper having a basis weight of 80 $g/m^2$ and Stöckigt sizing degree of 20 seconds was prepared by couching two layers each having a basis weight of 40 $g/m^2$ which were made by a cylinder short-Fourdrinier combination paper machine and in which the layer on the short-Fourdriner paper machine side served as a first support member 2 and the layer on the cylinder paper machine side served as a second support member 3. Base sheet 1 for heat transfer sheet was prepared by applying a polyvinyl alcohol (hereinafter referred to as "PVA"; PVA 105 available from Kurarey Co., Ltd.) onto the paper surface of second support member 3 in an amount of 5 $g/m^2$ (expressed in terms of the solid content) to form a barrier layer 4 for preventing sublimation. Further, a heat transfer sheet was prepared by applying an ink capable of being sublimated onto the surface of the PVA through printing to form a heat transferable layer 5. The resulting heat transfer sheet was put on a grid type automatic cutting machine, cutting marks 6 reached the boundary between second substance 3 and first substance 2 were made, from the side of heat transferable layer 5, on the heat transfer sheet along a reversed JIS mark and then the resulting JIS mark cut out therefrom was thermally transferred to polyester cloth in accordance with the procedures described above.

The heat transfer was carried out at a temperature of 150° C. and a pressure of 300 $g/cm^2$ for 1 minute. In this Example, all of the ability of forming cutting marks by the automatic cutting machine, ability of peeling second support member 3 from first support member 2 during the removal of the unnecessary portions of the heat transferable layer and the transfer properties of the heat transfer sheet were likewise excellent and thus the pattern could be transferred to the transfer substance in good quality.

EXAMPLE 4

Figure 2:
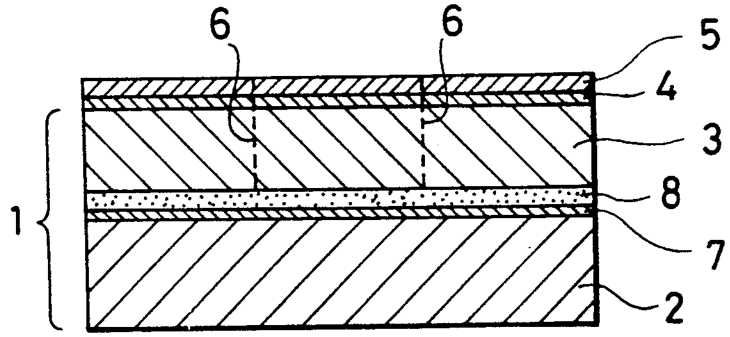
FIG. 2 is a cross sectional view showing another embodiment of the heat transfer sheet according to the present invention.

FIG. 2 is a cross sectional view showing a base paper obtained by laminating two layers through an adhesive layer and a heat transfer paper having the base paper provided thereon with a heat transferable layer, as a second embodiment according to the present invention.

Wood free paper having a basis weight of 70 $g/m^2$ was used as a first support member 2. A polyethylene resin layer serving as a barrier layer (not shown) was applied onto first support member 2 in a thickness of 17 μm through laminate coating. A solvent based silicone resin (KS-833 available from Shin-Etsu Chemical Co., Ltd.) was applied onto the polyethylene layer in an amount of 0.5 $g/m^2$ (expressed in terms of the solid content) to form a releasing layer 7. A polyester film having a thickness of 50 μm serving as a second support member 3 was laminated with first support member 2 on the side of the releasing layer 7 through a layer of curable adhesive 8 of an acrylate copolymer (Orivain BPS-4891 available from Toyo Ink Mfg. Co., Ltd.) to give laminated base sheet 1 for heat transfer sheet. A solvent-based silicone resin (SRX-370 available from Toray Dow Corning Silicone Company) was applied onto the surface of the second support member 3 opposite to that to which adhesive layer 8 of the polyester film in an amount of 0.7 $g/m^2$ (expressed in terms of the solid content) to form a releasing layer 4 and the same pigmented resin used in Example 1 was applied onto the releasing layer 4 in an amount of 5 to 10 $g/m^2$ (expressed in terms of the solid content) to form a heat transferable layer 5 and to thereby complete a heat transfer sheet. The resulting heat transfer sheet was put on a grid type automatic cutting machine, cutting marks 6 reached releasing layer 7 were made on the heat transfer paper along a reversed JIS mark and then the resulting JIS mark cut out therefrom was thermally transferred to polyvinyl chloride cloth for tent in accordance with the procedures described above. The heat transfer was carried out at a temperature of 110° C. and a pressure of 300 $g/cm^2$ for 3 minutes. In this Example, all of the ability of forming cutting marks by the automatic cutting machine, ability of peeling second support member 3 from first support member 2 during the removal of the unnecessary portions of the heat transferable layer and the transfer properties of the heat transfer sheet were likewise excellent and thus the pattern could be transferred to the transfer substance in good quality.

EXAMPLE 5

A glassine paper having a basis weight of 70 $g/m^2$ was used as a first support member 2. A solvent-based silicone resin (KS-833 available from Shin-Etsu Chemical Co., Ltd.) was applied onto one side of the paper in an amount of 0.8 $g/m^2$ (expressed in terms of the solid content) to form a releasing layer 7 and a polyethylene resin layer (not shown) was applied onto the other side of first support member 2 in a thickness of 17 μm through laminate coating for the purpose of moisture proofing. A second support member 3 was prepared by applying a polyethylene resin layer serving as a releasing layer 4 onto glassine paper having a basis weight of 70 $g/m^2$ in a thickness of 17 μm through laminate coating. These substrates were laminated in accordance with the manner used in Example 4 to give base sheet 1 for heat transfer sheet. A pigmented resin comprising a polyester resin and a pigment was applied onto releasing layer 4 of polyethylene resin formed on second support member 3 of glassine paper through laminate coating in an amount of 5 to 10 $g/m^2$ (expressed in terms of the solid content) to form a heat transferable layer 5 and to thereby give a heat transfer sheet. Using the resulting heat transfer sheet, a JIS mark thus cut out therefrom was thermally transferred to polyvinyl chloride cloth for tent in accordance with the same procedures used in Example 1 and under the same conditions used therein. In this Example, all of the ability of forming cutting marks by the automatic cutting machine, ability of peeling second support member 3 from first support member 2 during the removal of the unnecessary portions of the heat transferable layer and the transfer properties of the heat transfer sheet were likewise excellent and thus the pattern could be transferred to the transfer substance in good quality.

EXAMPLE 6

A polyester film having a thickness of 50 μm was used as a first support member 2. A solvent-based silicone resin (KS-833 available from Shin-Etsu Chemical Co., Ltd.) was applied onto one side of the film in an amount of 0.5 $g/m^2$ (expressed in terms of the solid content) to form a releasing layer 7. A second support member 3 was prepared by applying a polyethylene resin layer serving as a releasing layer 4 onto one side of glassine paper having a basis weight of 70 $g/m^2$ in a thickness of 17 μm through laminate coating. These substrates were laminated in accordance with the manner used in Example 4 to give a base sheet 1 for heat transfer sheet. The same heat transferable layer 5 used in Example 1 was applied onto releasing layer 4 of polyethylene resin formed on second support member 3 under the same conditions used in Example 1 to give a heat transfer sheet. Using the resulting heat transfer sheet, a JIS mark was thermally transferred to a sheet of an acrylic resin in accordance with the same procedures used in Example 1 and under the same conditions used therein. In this Example, all of the ability of forming cutting marks by the automatic cutting machine, ability of peeling second support member 3 from first support member 2 during the removal of the unnecessary portions of the heat transferable layer and the transfer properties of the heat transfer sheet were likewise excellent and thus the pattern could be transferred to the transfer substance in good quality.

EXAMPLE 7

A polyester film having a thickness of 50 μm was used as a first support member 2. A releasing layer 7 was formed on one side of the first support member 2 in the same manner used in Example 4. A polyester film having a thickness of 50 μm was likewise used as a second support member 3. A releasing layer 4 was formed on one side of the second support member 3 in the same manner used in Example 4. These two polyester films were laminated so that releasing layer 7 came in contact with the surface of the second support member 3 opposite to that carrying releasing layer 4 and then a pigmented resin which comprised an ethylene-vinyl acetate copolymer resin and a pigment was applied onto releasing layer 4 in an amount of 5 to 10 $g/m^2$ (expressed in terms of the solid content) to form a heat transferable layer 5 and to thereby give a heat transfer sheet. The resulting heat transfer sheet was put on a flat head type automatic cutting machine, cutting marks 6 reached releasing layer 7 were made on the heat transfer sheet along a reversed JIS mark and the JIS mark thus cut out therefrom was thermally transferred to polyester cloth at 110° C. and 300 $g/cm^2$ for 30 seconds. In this Example, all of the ability of forming cutting marks by the automatic cutting machine, ability of peeling second support member 3 from first support member 2 during the removal of the unnecessary portions of the heat transferable layer and the transfer properties of the heat transfer sheet were likewise excellent and thus the pattern could be transferred to the transfer substance in fine quality.

EXAMPLE 8

A glassine paper having a basis weight of 70 $g/m^2$ was used as a first support member 2. A solvent-based silicone resin (KS-833 available from Shin-Etsu Chemical Co., Ltd.) was applied onto one side of the paper in an amount of 0.8 $g/m^2$ (expressed in terms of the solid content) to form a releasing layer 7. SBR latex (not shown) was applied onto the other side of the paper in an amount of 10 $g/m^2$ (expressed in terms of the solid content) in order to prevent the paper from moisture. A second support member 3 was prepared by applying carnauba wax in an amount of 7 $g/m^2$ (expressed in terms of the solid contact) serving as a releasing layer 4 onto a glassine paper having a basis weight of 70 $g/m^2$. These members were couched in accordance with the manner used in Example 4 to obtain base sheet 1 for heat transfer sheet. Urethane resin and coloring agents serving as a coloring layer (not shown) was applied onto the carnauba wax of the second support member in an amount of 5 $g/m^2$ (expressed in terms of the solid content). Polyester resin serving as a heat transferable layer 5 was applied onto the coloring layer in an amount of 25 $g/m^2$ to 30 $g/m^2$ (expressed in terms of the solid content) to obtain a heat transfer sheet. The resulting heat transfer sheet was put on a grid type automatic cutting machine, cutting marks 6 reached releasing layer 7 were made on the heat transfer sheet along a reversed JIS mark and then the unnecessary portions were removed. Subsequently, the JIS mark thus cut out therefrom was thermally transferred to cotton cloth at 150° C. and 200 $g/cm^2$ for 20 seconds. In this Example, all of the ability of forming cutting marks by the automatic cutting machine, ability of peeling second support member 3 from first support member 2 during the removal of the unnecessary portions of the heat transferable layer and the transfer properties of the heat transfer sheet were likewise excellent and thus the pattern could be transferred to the transfer substance in good quality.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A base sheet for a heat transfer sheet, comprising:

a support member having heat resistance sufficient for heat which is applied to the base sheet during a heat transfer operation, said support member for supporting a thermally transferable layer comprising a first support member, and a second support member being peelably integrated with said first support member.

2. A base sheet for a heat transfer sheet as claimed in claim 1, further comprising a first releasing layer which is formed on the surface of said second support member not facing said first support member.

3. A base sheet for a heat transfer sheet as claimed in claim 1, further comprising an adhesive layer which is provided between said first and second support members, wherein said adhesive layer peelably bonds said first support member with said second support member.

4. A base sheet for a heat transfer sheet as claimed in claim 3, further comprising a first releasing layer which is formed on the surface of said second support member not facing said first support member.

5. A base sheet for a heat transfer sheet as claimed in claim 4, further comprising a second releasing layer which is formed on the surface of said first support member facing said second support member.

6. A base sheet for a heat transfer sheet as claimed in claim 1, wherein said first and second support members are couched papers.

7. A heat transfer sheet, comprising:

a base sheet including:

a first support member and a second support member peelable integrated with said first support member on a first surface of said second support member, a first releasing layer formed on a second surface of said second support member, and a thermally transferable layer having thermal adhesive properties, said thermally transferable layer peelably provided on said first releasing layer of said base sheet.

8. A heat transfer sheet as claimed in claim 7, wherein said first and second support members are couched papers.

9. A heat transfer sheet as claimed in claim 7, wherein said thermally transferable layer comprises a thermally adherable resin and an ink having a coloring agent.

10. A heat transfer sheet as claimed in claim 9, wherein said thermally adherable resin is selected from the group consisting of polyester resins, acrylic resins, vinyl chloride resins, vinyl chloride copolymer resins, and ethylene-vinyl acetate copolymer resins.

11. A heat transfer sheet as claimed in claim 7, further comprising an adhesive layer which is formed on the first surface of said second support member.

12. A heat transfer sheet as claimed in claim 7, further comprising a second releasing layer which is formed on said first support member, said second releasing layer for peeling off said second support member from said first support member.

13. A heat transfer sheet, comprising:

a base sheet including:

a first support member and a second support member peelable integrated with said first support member on a first surface of said second support member, a barrier layer member formed on a second surface of said second support member, and a thermally transferable layer formed on said barrier layer, said thermally transferable layer including an ink having a coloring agent which is capable of being thermally sublimated, wherein said barrier layer is a protective layer for preventing the ink from sublimation on the second surface of said second support member.

14. A heat transfer sheet as claimed in claim 13, wherein said first and second support members are couched papers.

15. A heat transfer sheet as claimed in claim 13, further comprising an adhesive layer which is formed on the first surface of said second support member.

16. A heat transfer sheet as claimed in claim 13, further comprising a releasing layer which is formed on said first support member, said releasing layer for peeling off said second support member from said first support member.

* * * * *